US010902341B1

(12) United States Patent
Qureshi

(10) Patent No.: US 10,902,341 B1
(45) Date of Patent: Jan. 26, 2021

(54) MACHINE LEARNING BASED LIST RECOMMENDATIONS

(71) Applicant: Amazon Technologies, Inc., Seattle, WA (US)

(72) Inventor: Aneeb Naveed Qureshi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 892 days.

(21) Appl. No.: 15/190,058

(22) Filed: Jun. 22, 2016

(51) Int. Cl.
*G06F 9/48* (2006.01)
*G06N 20/00* (2019.01)

(52) U.S. Cl.
CPC ........... *G06N 20/00* (2019.01); *G06F 9/4881* (2013.01)

(58) Field of Classification Search
CPC .............. G06F 3/04842; G06F 9/4881; G06Q 30/0275; G06N 20/00
See application file for complete search history.

(56) References Cited

U.S. PATENT DOCUMENTS

| | | | | |
|---|---|---|---|---|
| 8,666,844 B2 * | 3/2014 | Shaya | ................... | G06Q 30/02 705/26.1 |
| 2011/0251988 A1 * | 10/2011 | Pronk | ................ | H04N 7/17336 706/46 |
| 2013/0086490 A1 * | 4/2013 | Roskind | ............. | G06F 3/04842 715/760 |
| 2015/0012367 A1 * | 1/2015 | Simo | .................. | G06Q 30/0275 705/14.71 |
| 2015/0135238 A1 * | 5/2015 | Wickenkamp | ..... | H04N 21/4122 725/80 |
| 2017/0061497 A1 * | 3/2017 | Akkiraju | ............ | G06Q 30/0269 |

* cited by examiner

*Primary Examiner* — Li Wu Chang
(74) *Attorney, Agent, or Firm* — Lee & Hayes, P.C.

(57) ABSTRACT

A machine learning engine may correlate user profile data and/or list item data with a service provider action that may lead to a particular user action with respect to a list item (e.g., a task item of a to-do list, a content item of a content item queue, etc.). For example, a task item performance application may process user profile data and/or task item profile data to generate training data. In addition, the machine learning engine may generate a task item performance model using the training data by identifying indicators that correlate with the particular user action. Additionally, the task item performance application may then use the task item performance model to suggest actions that may be performed by a service provider to increase the likelihood of the user performing the particular user action with respect to the list item. Further, the machine learning engine may also determine weights for individual indicators.

20 Claims, 7 Drawing Sheets

MACHINE LEARNING BASED LIST RECOMMENDATIONS

BACKGROUND

Many users of digital applications and/or services manage lists that include one or more items of interests. For instance, a user may manage a to-do list of tasks in a to-do list application. In another instance, a user may manage a queue of content items that the user would like to consume at a later date via a content service. In many cases, the lists can grow to sizes that cause management of the lists to become burdensome and/or inefficient. Furthermore, as the lists grow in size it may become intimidating for users to follow up on their initial interest in the items of the list. As such, users and related parties may be prevented from reaping the benefits of the user activity corresponding to the items of the list. For example, a user may choose not to use a content item queue due to a prohibitive size of the content item queue.

BRIEF DESCRIPTION OF THE DRAWINGS

The detailed description is set forth with reference to the accompanying figures. In the figures, the left-most digit of a reference number identifies the figure in which the reference number first appears. The use of the same reference numbers in different figures indicates similar or identical items or features.

DETAILED DESCRIPTION

Figure 1:
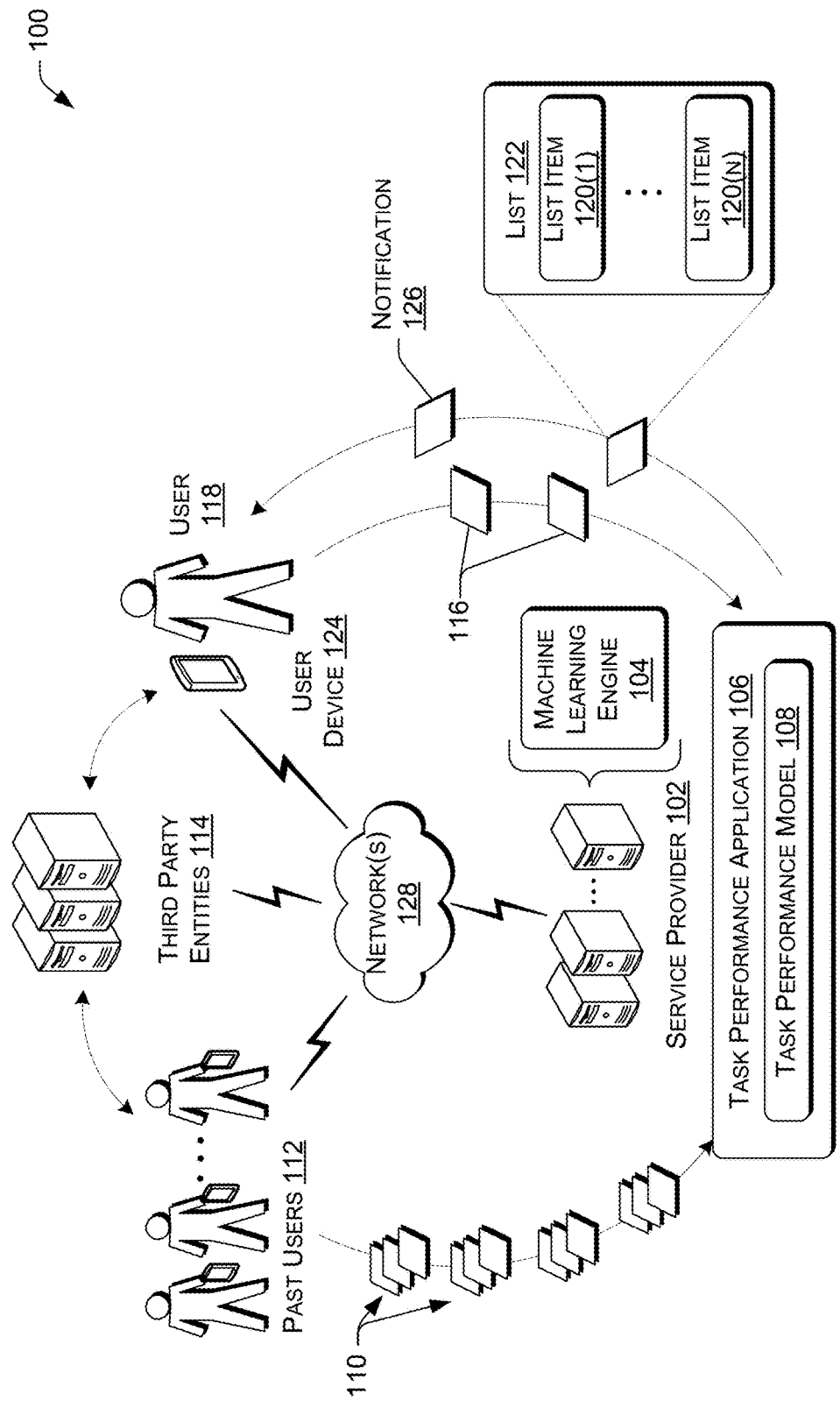
FIG. 1 is a schematic diagram of an illustrative computing environment usable to determine an action to perform with respect to a task item using machine learning, according to various examples.

This disclosure is directed to using a machine learning (ML) engine to correlate user profile data and/or list item data with a service provider action that may lead to a particular user action (performance, consumption, conversion, etc.) with respect to a list item (e.g., a task item of a to-do list, a content item of a content item queue, a purchase item of a wish list, etc.). A task item performance application may process user profile data and/or list item profile data to identify historical task item information. Further, the historical task item information may be used as training data to create a task item performance model. Additionally, the task item performance application may then use the task item performance model to identify trends in current task item information that may suggest actions that may be performed by a service provider to increase the likelihood of the performance of a task item. By using this approach, large amounts of data may be leveraged efficiently to create a task item performance model that helps users perform planned task items.

Historical information may be processed by the machine learning engine to create a task item threshold model. For instance, the machine learning engine may identify indicators that have a strong correlation with performance of a task item. The indicators may include browsing history, demographic information, user requests, time of day, time of year, an amount of time a task item has been pending, an estimate of an amount of time required to complete a task item, weather patterns, travel patterns, location information, financial account information, financial account projections, spending patterns, biometric information, user purchases, and/or other data events associated with users. In some embodiments, this data may be captured by third party entities that exchange data with users. Further, the machine learning engine may determine weights for individual indicators. The weights may calibrate or apportion the influence of the respective individual indicators. The task item threshold model may be deployed to analyze current user data and/or current task item data, and predicts an amount of time before the likelihood of a user performing a task item falls below a predetermined score. In some embodiments, the task item threshold model may be updated over time by the machine learning engine as data correlations evolve over time.

In addition, historical information may be processed by the machine learning engine to create a task item performance model. Within the historical information, the machine learning engine may identify data instances, referred to herein as "indicators", that have a strong correlation with the performance of an action with respect to a task item. The indicators may include browsing history, demographic information, user requests, time of day, time of year, an amount of time a task item has been pending, an estimate of an amount of time required to complete a task item, weather patterns, travel patterns, location information, financial account information, financial account projections, spending patterns, biometric information, user purchases, and/or other data events associated with users. In some embodiments, this data may be captured by third party entities that exchange data with users. Further, the machine learning engine may determine weights for individual indicators. The weights may calibrate or apportion the influence of the respective individual indicators. The task item performance model may be deployed to analyze current user data and/or current task item data, and determine a recommended action for influencing a user to perform a task item. In some embodiments, the task item performance model may be updated over time by the machine learning engine as data correlations evolve over time.

In some examples, the recommended actions may include displaying a list item in a prominent position of a graphical user interface, sorting and/or ranking list items of a list, displaying information related to the list item in a graphical user interface, applying one or more graphical effects to a listing of a list item in a graphical user interface, sending a notification associated with a list item to one or more devices associated with a user profile, and/or displaying items and/or services related to the list item. For instance, a recommended action may include modifying at least one of a style, appearance, graphical and/or textual content, font, typeface, color schema, or layout of a visual representation of a list item.

The techniques and systems described herein may be implemented in a number of ways. Example implementations are provided below with reference to the following figures.

FIG. 1 is a schematic diagram of an illustrative computing environment 100 usable to determine, using machine learning, an action to perform with regard to a task item. The environment 100 includes a service provider 102. The service provider 102 includes a machine learning engine 104 to create and deploy a task performance application 106 and a task performance model 108.

In accordance with one or more embodiments, the service provider 102 may receive historical data 110 associated with a large sample of users 112. In some instances, the historical data 110 may be provided by one or more third party entities 114. In some embodiments, the historical data 110 may include at least historical user profile data associated with specific users, and historical task item data associated with specific past task items. The historical data 110 may be provided in batches and may provide a large number of samples for use by the task performance application 106 and/or the task performance model 108.

In some embodiments, the historical data 110 may be used by the task performance application 106 to create training data to build the task performance model 108. In some examples, the historical data 110 may include information describing the creation of a prior task item by a user 112, and the performance of the prior task item by the user 112. Further, the historical data 110 may include user interaction data (e.g., browsing activity, search activity, etc.) of the user 112 with respect to the service provider 102. The task performance application 106 may output or otherwise make data (e.g., training data) accessible to enable building of the task performance model 108, using the machine learning engine 104.

The machine learning engine 104 may build the task performance model 108 and update the task performance model 108 over time. The training data may be analyzed by the machine learning engine 104 to determine indicators (i.e., specific data) that have strong correlations with performance of a task item within a threshold amount of time (e.g., x weeks prior to performance, x number of days prior to performance, etc.). The machine learning engine 104 may determine weights that apportion an influence of each of the indicators. The machine learning engine 104 may generate the task performance model 108 using the indicators and weights, which work as a function to determine recommended actions for causing performance of task items. However, the task performance model 108 may also be implemented without the use of weights.

The service provider 102 may receive user data 116 associated with a user 118 using a user device 124. In some instances, the user data 116 may be provided by at least some of the one or more third party entities 114. In some embodiments, the user data 116 may include at least user profile data and user interaction data associated with the user 118. The user data 116 may be provided in a stream or in frequent transmissions of data, which provide timely inputs to the task performance model 108.

Some common examples of the user device 124 may include vehicles, wearable electronic devices, digital media devices and eBook readers; tablet computing devices; and smart phones and mobile devices. For instance, the user device 124 may include a vehicle navigation device, a portable device, such as a cellphone, a smart phone, a media player, a portable gaming device, a laptop computer, or other typically handheld devices that are easily passed between users. Further, in some examples herein, the user device 124 may be a wearable device or a device that is otherwise transported by the user 118.

The task performance model 108 may use the user data 116 as inputs to determine recommended actions for influencing the user 118 to perform one or more task items 120(1)-120(N) of a task list 122 associated with the user 118. For example, the user data 116 may be analyzed to generate indicators that are input into the task performance model 108. The task performance model 108 may apply the weights to the indicators to apportion the influence of the respective individual indicators. Further, the task performance model 108 may determine a recommended action with respect to a particular list item 120(1) based at least based on occurrences of the indicators in the user data 116. For example, for a plurality of potential service provider actions, the task performance model 108 may calculate a likelihood that performing the action will influence the user 118 to perform the task item 120(1).

In some examples, the task performance model 108 may output the action with the highest likelihood of causing the user 118 to perform the task item 120(1). For instance, the task performance model 108 may determine that sending a notification 126 to the device 124 associated with the user 118 is most likely to cause the user 118 to perform the task 120(1). Consequently, the task performance model 108 may output sending a notification associated with task 120(1) to the device 124.

In some other examples, the task performance model 108 may output one or more actions having a likelihood above a predetermined threshold score. For instance, the task performance model 108 may calculate a first probability that sending the notification 126 to the device 124 associated with the user 118 will cause the user 118 to perform the task 120(1). Additionally, the task performance model 108 may calculate a second probability that applying a graphical effect to a visual listing of the task 120(1) will cause the user 118 to perform the task 120(1). Further, the task performance model 108 may determine that the first probability and the second probability are greater than a predetermined threshold. Consequently, the task performance model 108 may output sending the notification 126 to the user device 124 associated with the user 118, and applying the graphical effect to a visual listing of the task item 120(1).

The service provider 102 may exchange data with user devices, such as the user device 124, and/or the third party entities 114 via one or more networks 128. The networks 128 may be wired or wireless networks that facilitate exchange of data, request, and/or other information or signals.

Figure 2:
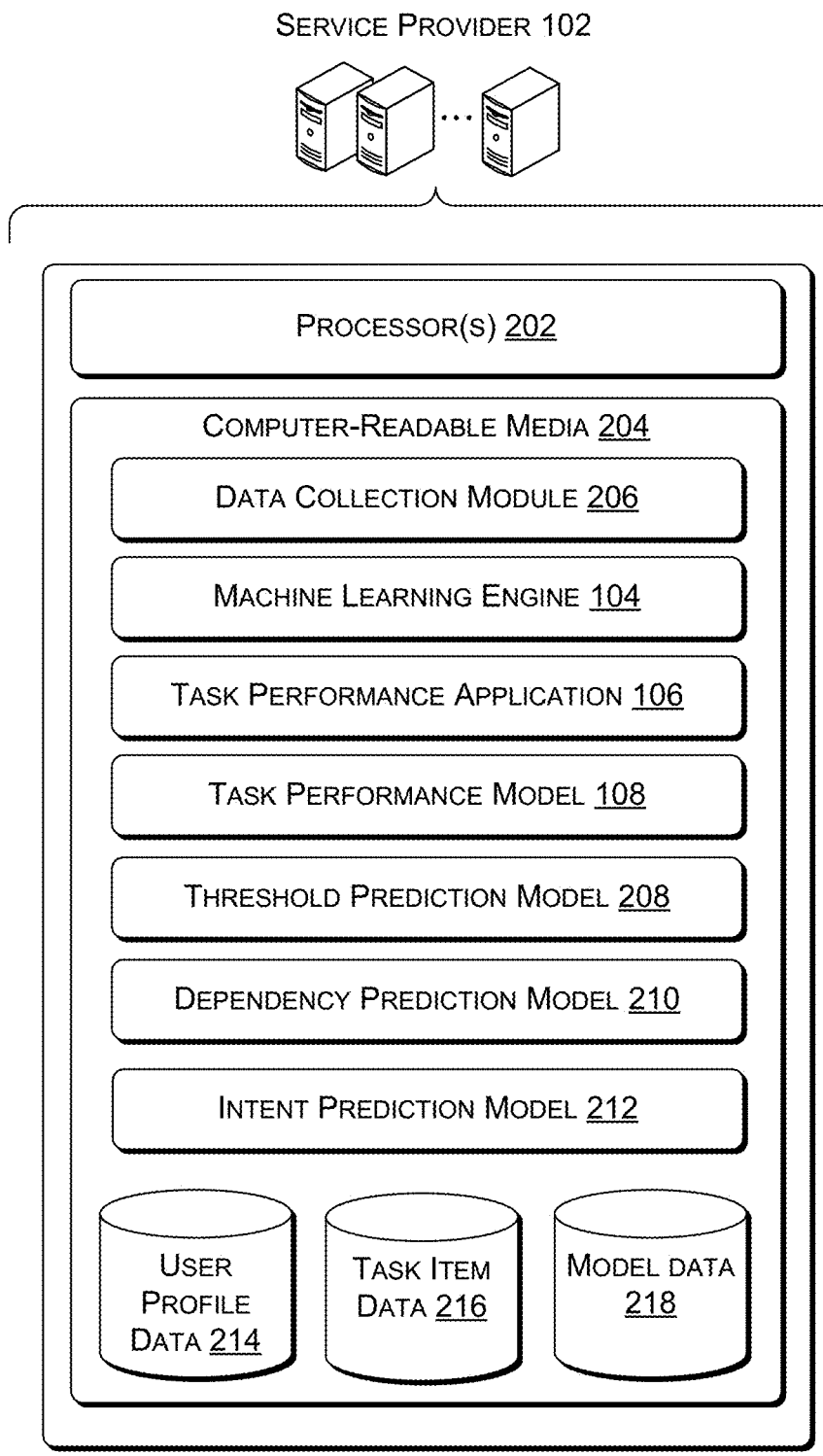
FIG. 2 is a block diagram of an illustrative computing architecture for determining an action to perform with respect to a task item using machine learning, according to various examples.

FIG. 2 is a block diagram of an illustrative computing architecture 200 for determining an action to perform with regard to a task item using machine learning. The computing architecture 200 may be implemented in a distributed or non-distributed computing environment.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the service provider 102.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store a data collection module 206, the machine learning engine 104, the task performance application 106, the task performance model 108, a threshold prediction model 208, a dependency prediction model 210, and an intent prediction model 212, which are described in turn. The components may be stored together or in a distributed arrangement. The service provider 102 may also store or have access to user profile data 214, task item data 214, and model data 216, which may be stored locally and/or remotely.

The data collection module 206 may collect the historical data 110 and the user data 116. The historical data 110 and the user data 116 may be received from devices associated with the other users 112 and the user 118, directly, and/or from the third party entities 114 that interact with devices associated with the other users 112 and the user 118. In some embodiments, the data collection module 206 may store the historical data 110 and the user data 116 in the user profile data 214, which may be accessed for analysis and for other reasons as discussed herein. The user profile data 214 may include data associated with user names, user accounts, user email addresses, location information, biometric information, birthday information, anniversaries, demographic information, traits, interests, wish lists, registries, browsing history, purchase history, search history, memberships, subscriptions, employment information, shipping addresses, billing addresses, credit card accounts, bank accounts, rewards accounts, Internet Protocol addresses, wireless network service set identifiers, electronic devices associated with a user, and/or other data events. In some examples, the data collection module 206 may collect and/or receive data to populate the user profile data 214.

The task item data 216 may include data associated with a performance or a pendency of individual task items 120(1)-120(n). Additionally, the task item data 216 may include one or more attributes of the individual task items 120(1)-120(n). For example, the task item data 216 may include one or more list item types associated with an individual task item, one or more list types of a list that includes the individual task item (e.g., to-do list), one or more other task items associated with the individual task item, a date of performance of the individual task item, an amount of time the individual task item was pending, one or more actions performed by the service provider and/or a third party entity with respect to the individual task item, and/or one or more activities that confirmed performance of the individual task item. Further, the task item data 216 may include contextual information associated with an individual list item. For instance, the task item data 216 may include a time of year the list item was created or converted, a time of day the list item was created or converted, weather information pertaining to a time period associated with the pendency of the individual task item, economic information pertaining to a time period associated with the pendency of the individual task item, financial information of a user associated with the individual task item during a time period associated with the pendency of the individual task item, biometric information of a user associated with the individual task item during a time period associated with the pendency of the individual task item. In some examples, the data collection module 206 may collect and/or receive data to populate the task item data 216.

The machine learning engine 104 may perform analytics, including statistical analytics, to assist in functions performed by the task performance application 106, and for formation and maintenance of the task performance model 108, the threshold prediction model 208, the dependency prediction model 210, and/or the intent prediction model 212.

For example, the machine learning engine 104 may determine updated information and later revise criteria for determining a recommended action based on samples from a larger population of users or more current data. The machine learning engine 104 may determine strength of correlations between the user profile data 214, the task item data 216, and a successful recommendation action to enable building or refining the task performance model 108.

Some indicators may become less correlated with a relocation over time, such as when the indicators become obsolete or are unused (e.g., are not frequent or as frequent in the user profile data 214). Therefore, the machine learning engine 104 may revise, update, or create new weights for the indicators, at times, such as based on changes to the strength of the correlations over time. Thus, the machine learning engine 104 may, at times, perform additional analysis of data, such as the user profile data 214 and/or the task item data 216 to leverage trends included in more recent data to improve the accuracy of the task performance model 108 or at least prevent the accuracy from significantly being diminished due to changes in user behavior and/or by other factors.

The task performance application 106 may output or otherwise make data accessible as training data (e.g., user profile data 214, task item data 216, etc.) to enable building the task performance model 108, the threshold prediction model 208, the dependency prediction model 210, and/or the intent prediction model 212, using the machine learning engine 104. The user profile data 214 and/or the task item data 216 used by the task performance application 106 may be limited to data associated with activity within a predetermined amount of time, such as within a year, within two years, within fourteen months, etc. The predetermined amount of time may be determined by the machine learning engine 104 to prevent or minimize use of stale or outdated information. The machine learning engine 104 may account for seasonal variances, which may account for holidays, changes in preferences due to seasonality, and so forth.

Further, the user profile data 214 and/or task item data 216 may include past task items that have been identified as being performed by a user or a service provider. For example, the user 118 may indicate to the service provider 102 that the user 118 has completed the task item 120(1) of the to-do list 122. Additionally, or alternatively, the task performance application 106 may determine and validate potential performances of the task items 120. For instance, the task performance application 106 may use the user profile data 214 to validate and/or determine reliability of potential performance of the task items 120.

The task performance model 108 may recommend actions for influencing a user to perform a task item (e.g., task item 120(1)). The task performance model 108 may include indicators and possibly weights for the indicators. The indicators may be variables that are populated by information from, or derived from, the user profile data 214 and/or the task item data 216. The task performance model 108 may evolve over time, via updates, such as changes to indicators, changes to weights, and/or other changes. As discussed above, the machine learning engine 104 may determine a correlation of the user profile data 214 and/or the task item data 216 with performance of a task item by processing data associated with many users and/or task items, and by updating the correlations over time. Thus, the task performance model 108, possibly in conjunction with the machine learning engine 104, may determine identifiers and/or weights for use in the task performance model 108, which may be stored in the model data 216. The task performance model 108 may be a function that recommends an action to perform in order to cause the user 118 to perform a task item 120, where many identifiers are included in the function, such as hundreds or thousands of identifiers. The identifiers may be specific data, such as location information associated with a user device, spending patterns of a user, browsing history associated with specific items or groups of items, and so forth.

Once created, the task performance model 108 may be used or deployed to recommend actions for influencing users to perform task items. The task performance model 108 may use the user profile data 214 and/or the task item data 216 as inputs to recommend an action. For example, the task item 120(1) may represent a wish list task to purchase an item from the service provider 102. Further, the task performance model 108 may determine that presenting a notification of a sale price of the item maximizes the likelihood of the user 118 purchasing the item. Therefore, the task performance model 108 may recommend that the service provider 102 notify the user 118 of the sale price of the wish list item corresponding to the task list item 120(1). Additionally, the task performance model 108 may output from the threshold prediction model 208, the dependency prediction model 210, and/or the intent prediction model 212 as input to recommend an action.

The task threshold prediction model 208 may predict an amount of time during which the likelihood of performance of a task item is greater than a predetermined score. The task threshold prediction model 208 may include indicators and possibly weights for the indicators. The indicators may be variables that are populated by information from, or derived from, the user profile data 214 and/or the task item data 216. The task threshold prediction model 208 may evolve over time, via updates, such as changes to indicators, changes to weights, and/or other changes. As discussed above, the machine learning engine 104 may determine a correlation of the user profile data 214 and/or the task item data 216 with the performance of task items by processing data associated with many users and task items, and by updating the correlations over time. Thus, the task threshold prediction model 208, possibly in conjunction with the machine learning engine 104, may determine identifiers and/or weights for use in the task threshold prediction model 208, which may be stored in the model data 218.

The task threshold prediction model 208 may be a function that calculates a probability of performance of a task item over a period of time and determines when the probability of performance of the task items falls below the predetermined score, where many identifiers are included in the function, such as hundreds or thousands of identifiers. The identifiers may be specific data, such as a schedule of a user 118, location tracking of user devices (e.g., user device 124), a financial account balance of a user 118, user purchases in a predetermined time period, browsing history of user devices (e.g., user device 124), seasonal variances, and so forth.

Once created, the task threshold prediction model 208 may be used or deployed to predict an amount of time during which the likelihood of performance of the task item 120(1) is greater than a predetermined score. The task threshold prediction model 208 may use some of the user profile data 214 associated with the user 118 and/or the task item data 216 as inputs to determine the threshold amount of time during which that the likelihood of a performance of the task item 120(1) is greater than the predetermined score. In some instances, the likelihood of performance of the task item 120(1) may not be greater than the predetermined score after the threshold amount of time. In some other instances, an average of the likelihood of performance of the task item 120(1) over a period of time after the threshold amount of time may not be greater than the predetermined score.

In some examples, the user 118 may indicate a relationship between two or more of the task items 120. For instance, the user 118 may indicate that task 120(1) and 120(2) may be performed at the same location. In some other examples, the dependency prediction model 210 may determine a relationship between a likelihood of performance of a first task item (e.g., task item 120(1)) and a likelihood of performance of one or more other task items (e.g., 120(2)-120(n)). The dependency prediction model 210 may include indicators and possibly weights for the indicators. The indicators may be variables that are populated by information from, or derived from, the user profile data 214 and/or the task item data 216. For example, the indicators may include a type of the list item. For instance, the dependency prediction model 210 may identify a strong correlation between task items for purchasing gifts (i.e., a first type of task item) and task items for submitting an rsvp for a social event (i.e., a second type of task item). The dependency prediction model 210 may evolve over time, via updates, such as changes to indicators, changes to weights, and/or other changes. Further, the machine learning engine 104 may determine a correlation of the user profile data 214 and/or the task item data 216 with a relationship between two or more task items 120 by processing the user profile data 214 and/or the task item data 216, and by updating the correlations over time. Thus, the dependency prediction model 210, possibly in conjunction with the machine learning engine 104, may determine identifiers and/or weights for use in the dependency prediction model 210, which may be stored in the model data 218.

In some examples, the user 118 may provide an indication of when the user expects to perform the task item 120(1). For instance, the user 118 may indicate a deadline for completing the task item 120(1). In another instance, the task item 120(1) may implicitly indicate when the user expects to perform the task item 120(1). For instance, the user 118 may add to a queue of content items, a queue item representing purchasing and viewing of a particular content item. Further, the availability of content item may expire after a predetermined period of time. Thus, the expiration date would indicate a date by which the user 118 expects to perform the task item 120(1) (i.e., purchase and view the content item). In some other examples, the intent prediction model 212 may determine an intent of the user 118. The intent prediction model 212 may include indicators and possibly weights for the indicators. The indicators may be variables that are populated by information from, or derived from, the user profile data 214 and/or the task item data 216. The task intent prediction model 212 may evolve over time, via updates, such as changes to indicators, changes to weights, and/or other changes. Further, the machine learning engine 104 may determine a correlation of the user profile data 214 and/or the task item data 216 with an intent of the user 118 by processing the user profile data 214 and/or the task item data 216, and by updating the correlations over time. Thus, the intent prediction model 212, possibly in conjunction with the machine learning engine 104, may determine identifiers and/or weights for use in the intent prediction model 212, which may be stored in the model data 218. For example, the intent prediction model 212 may predict that the user 118 intends to perform an outdoor task prior to a certain date based on seasonality and/or weather. As another example, the intent prediction model 212 may predict that the user 118 intends to purchase an item after a specific date based upon spending patterns and/or a projection of a financial account.

In some examples, the machine learning engine 104 may employ well known machine learning techniques to build the task performance model 108, the threshold prediction model 208, the dependency prediction model 210, and/or the intent prediction model 212. For example, the machine learning procedures may include at least one of a random forest procedure, a neural network procedure, a hidden Markov Model procedure, a k-nearest neighbor procedure, clustering procedure, classification procedure, and so forth.

Figure 3:
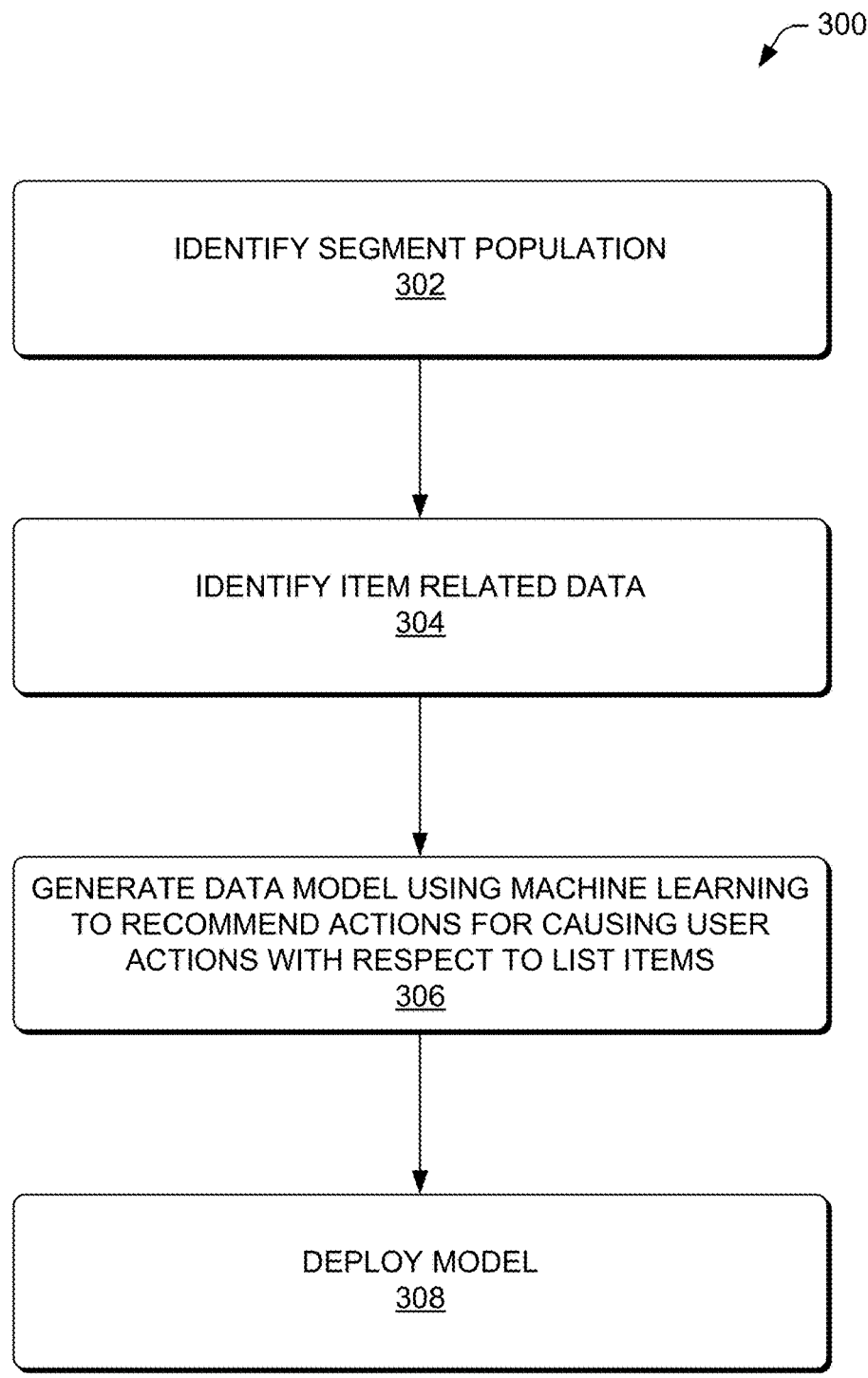
FIG. 3 is a flow diagram of an illustrative process for determining an action to perform with respect to a task item using machine learning, according to various examples.

FIG. 3 is a flow diagram of an illustrative process 300 for determining an action to perform with regard to a task item using machine learning. The process 300 is described with reference to the environment 100 and the computing architecture 200, and may be performed by the service provider 102.

At 302, the segment population may be identified. For example, the machine learning engine 104 may select or receive input to define data to be included in a population. The data may be selected as being within a predetermined time frame (e.g., data within last x number of days/months/years, etc.), thus removing stale data that may prevent accurate predictions.

At 304, a list item application may identify item related data. The item related data may include information corresponding to user action with respect to prior list items. For example, the item related data may include a plurality of past task items associated with the past users 112. Further, the item related data may include dates of performance of the individual past task items, past user 112 activity prior to the performance of the individual past task items, and/or actions taken by the service provider 102 to influence the past users 122 to perform the past tasks items. In some examples, the item related data may be stored in the user profile data 214, and/or the task item data 216.

At 306, a recommendation model may be generated, using the machine learning engine 104, by correlating user profile data and/or list item data to user actions with respect to list items. For example, a strong correlation may exist between warm weather and the performance of task items corresponding to outdoor activities. Therefore, warm weather may be selected as an indicator for use in the task performance model 108. Additionally, a strong correlation may exists between providing calendar invitations to a calendar program of the device 124 of the user 118 and performance of tasks by the user 118. Therefore, calendar invitations may be selected as both an indicator and a recommended action for use in the task performance model 108. In some examples, indicators may be as simple as the device 124 the user 118 currently possess, a location of the user 118, whether the user 118 is awake, an account balance of the user 118, a website visited by the user 118, and so forth.

At 308, the task performance model 108 may be deployed for recommending actions for influencing act with respect to a list item. For example, the task performance model 108 may be used to influence the user 118 to complete a weekly outdoor jogging exercise 120(2). The task performance model 108 may identify dates and times when the weather is warm and the user 118 is free to perform the jogging exercise 120(2). Further, the task performance model 108 may recommend that the service provider 102 send the user 118 calendar invites corresponding to the identified dates in order to influence the user 118 to complete the outdoor jogging exercise 120(2). The task performance model 108 may determine the recommended action in response to triggers, such as in response to creation of a list item, at periodic intervals, at random times, and/or at other times.

Figure 4:
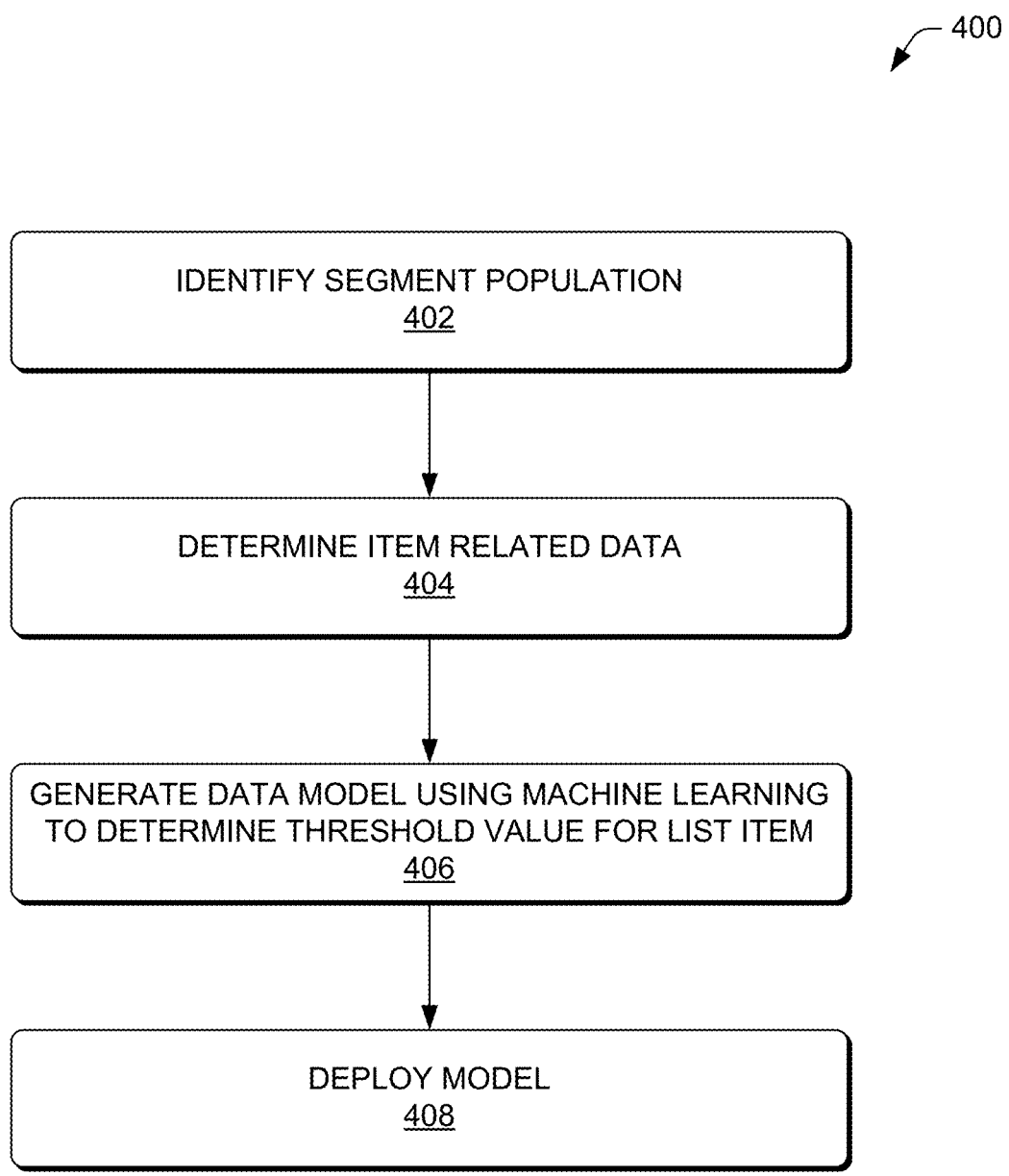
FIG. 4 is a flow diagram illustrating a process for determining a threshold for user action with respect to a task item using machine learning, according to some examples.

FIG. 4 is a flow diagram of an illustrative process 400 determining a threshold for user action with respect to a task item using machine learning. The process 400 is described with reference to the environment 100 and the computing architecture 200, and may be performed by the service provider 102.

At 402, the segment population may be determined. For example, the machine learning engine 104 may select or receive input to define data to be included in a population. The data may be selected as being within a predetermined time frame (e.g., data within last x number of days/months/years, etc.), thus removing stale data that may be create accurate predictions.

At 404, a list item application 106 may identify item related data. The item related data may information corresponding to user action with respect to prior list items. For example, the item related data may include a plurality of previously queued content items. Further, the item related data may include dates of consumption of the queued content items, user activity associated with the consumption of the content items, and/or actions taken by a service provider 102 to influence the past users 112 to consume the queued contents. In some examples, the item related data may be stored in the user profile data 214, and/or the task item data 216.

At 406, a threshold model may be generated, using the machine learning engine 104, by correlating user profile data and/or list item data to user actions with respect to list items. For example, a strong correlation may exist between cold weather and the amount of time spent consuming content items. Therefore, cold weather may be selected as an indicator for use in the threshold prediction model 208. As another example, a strong correlation may exist between consumption of free content and a financial account balance. Therefore, a financial account balance and/or projected financial account balance may be selected as an indicator for use in the threshold prediction model 208.

At 408, the threshold model may be deployed for determining a threshold amount of time during which the likelihood of performance of the list item is greater than a predetermined score. For example, the threshold prediction model 208 may be used to determine how many days a particular film can belong to a movie queue before the likelihood of the user consuming the film is less than a predetermined threshold. For instance, the threshold prediction model 208 may identify that for the first fourteen days the film is on the movie queue the likelihood of the user viewing the film is greater than a predetermined threshold. For instance, the threshold prediction model 208 may identify that projected balance of a financial account of the user 118 after fourteen days significantly lowers the likelihood that the user 118 will purchase the content item and view the content item. As a result, the service provider 102 may perform an action in view of determining that the amount of time the film has been on the movie queue is greater than the threshold amount. For instance, the service provider 102 may remove the film from the movie queue. In another instance, the service provider 102 may use the task performance model 108 to determine a recommended action to perform in light of the pendency of the film. Additionally, the threshold prediction model 208 may determine the threshold amount of time in response to triggers, such as in response to the addition of the content item to a queue, at periodic intervals, at random times, and/or at other times.

Figure 5:
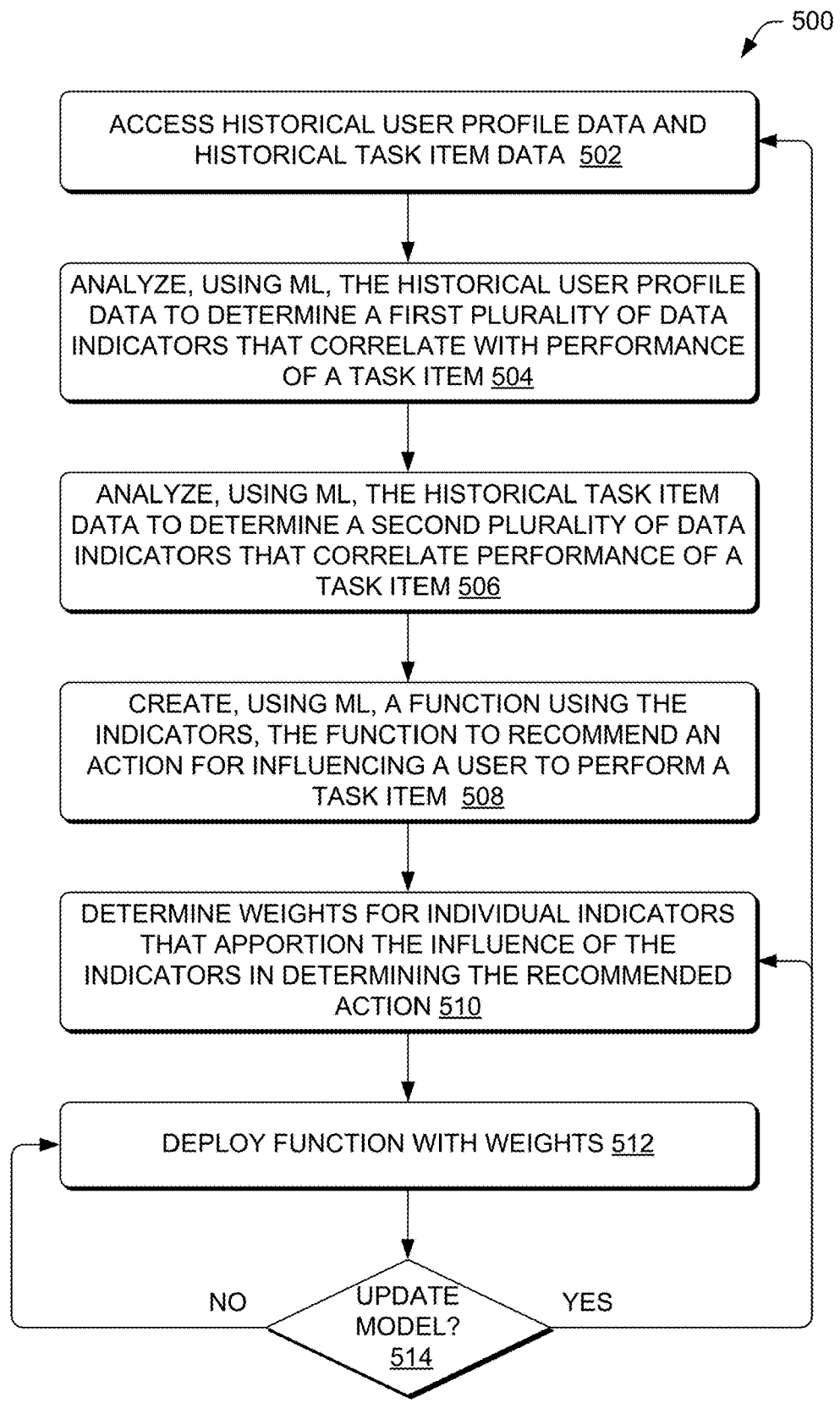
FIG. 5 is a flow diagram illustrating a process for determining an action to perform with respect to a task item using machine learning, according to some examples.

FIG. 5 is a flow diagram of an illustrative process 500 that may be performed by the service provider. The process 500 is described with reference to the environment 100 and the computing architecture 200.

At 502, machine learning engine may access historical user profile data and/or task item data, which may be used as training data to develop a task performance model. For instance, the machine learning engine 104 may access user profile data 214 and/or task item data 216 to generate the task performance model 108.

At 504, the machine learning engine 104 may analyze the historical user profile data to determine a first plurality of data indicators that correlate with a performance of a task item. For instance, the machine learning engine 104 may process the user profile data 214 associated with multiple successful task performances to determine common and highly correlated indicators of performances of task items by past users 112. Further, the machine learning engine 104 may process the user profile data 214 associated with multiple successful task performances to determine the threshold prediction model 208, the dependency prediction model 210, and the intent prediction model 212.

At 506, the machine learning engine 104 may analyze the historical task item data to determine a second plurality of data indicators that correlate with a performance of a task item. For example, the machine learning engine 104 may process the task item data 216 associated with multiple successful task performances to determine common and highly correlated indicators of performances of task items by past users 112. Further, the machine learning engine 104 may process the task item data 216 associated with multiple successful task performances to determine the threshold prediction model 208, the dependency prediction model 210, and the intent prediction model 212. In some other examples, the machine learning engine 104 may process the task item data 216 associated with multiple successful task performances of a particular type of task item to determine common and highly correlated indicators of performances of the type of task item by past users 112.

At 508, the machine learning engine 104 may create or assist in creation of the recommendation model. For example, the machine learning engine may generate the task performance model 108, which may be expressed as a function. The task performance model 108 may recommend actions for influencing the user 118 to perform a task item 120(1). The task performance model 108 may use user profile data 214 of the user 118 and/or task item data 216 related to the task item 120(1) as inputs to the function of the task performance model 108, which may then create then recommend an action for influencing the user to perform the task item 120(1). The function may be calculated often, such as daily, after certain data triggers, randomly, and/or at other times.

At 510, the machine learning engine may determine weights for individual indicators that apportion the influence of the indicators in determining the recommended action. The weights may be included in the task performance model 108 as part of the function. For example, the weights may be created to reflect the strength of the correlation of indicators. The weights may also be based at least partly on the frequency of occurrence of some indicators. However, some functions or models may not use weights.

At 512, the task performance model may deploy the function for use with current information. For example, task performance model 108 may be continually updated for the user 118 to output a most current recommendation for influencing the user 118 to perform the task 120(1). Further, the service provider 102 may perform the one or more recommended actions output by the task performance model 108. For instance, the task performance model 108 may receive input of the task item 120(1). The task item 120(1) may correspond to a reminder to upgrade software on a device of the user 118. Further, the task performance model 108 may recommend that the service provider 102 email the user 118 a download link to an upgrade executable. In addition, the service provider 102 may determine an email address of the user 118 from the user profile data 216, and send the user 118 a download link to the upgrade executable at the email address.

At 514, the machine learning engine 104 may, at times, determine to update the model. The update may be random, in response to an update request, periodic, or at other times. The update may incorporate recent data to update the indicators, weights, and/or other aspects of the task performance model 108. When the update is to be performed, the process 500 may advance to the operation 502 (to update the entire model or parts of the model) or the operation 508 (to update the weights). Otherwise the process 500 may continue at the operation 512 by deploying the task performance model 108.

Figure 6:
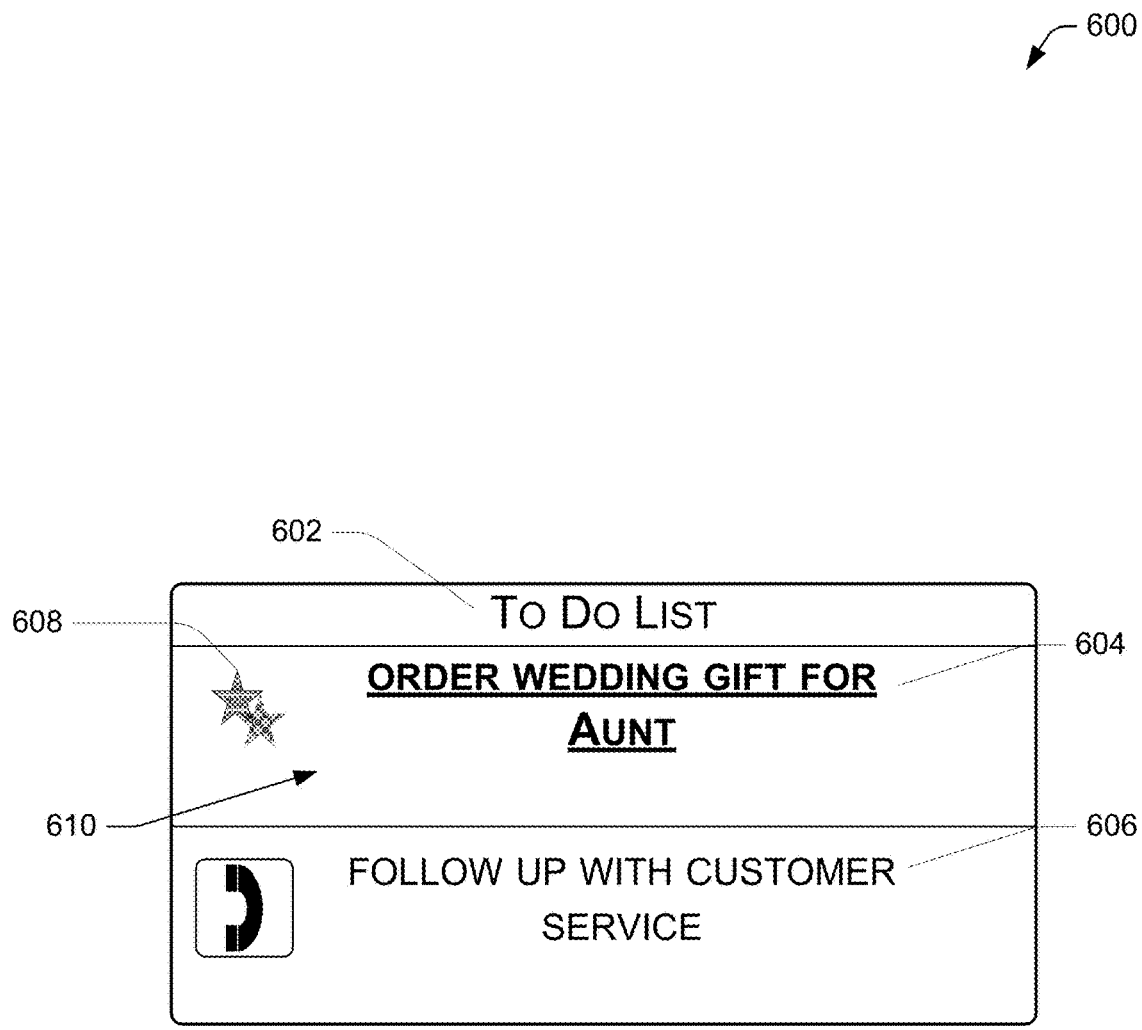
FIG. 6 is an example interface for applying graphical effects to a listing of a task item in a graphical user interface, according to various examples.

FIG. 6 illustrates an example application of graphical effects to task items. Referring to FIG. 6, suppose that the user 118 maintains a to-do list 602 that includes a task item 604 that represents ordering a wedding gift, and a task item 606 that represents following up with a customer service representative. As described herein, the task performance model 108 may recommend that the service provider 102 apply a graphical effect to the task item 604 in order to influence the user 118 to perform the task item 604 (i.e. order the wedding gift).

As illustrated in FIG. 6, the service provider 102 may emphasize (e.g., bold, underline, italicize, font, font color, font size, etc.) the text of the task item 604. Further, the service provider 102 may add a visual marker 608 to a visual area 610 corresponding to the task item 604. In some examples, the type or appearance of the visual marker 608 may communicate an attribute of the task item 604. For instance, the visual marker 608 take the form of an hour glass when a deadline associated with the task item is approaching. In some other examples, the service provider 102 may apply graphical effects to the visual area 610 corresponding to the task item 604. Additionally, or alternatively, the service provider 102 may provide supplemental information related to the task item 604 in the visual area 610. For example, the service provider may provide one or more gift recommendations in the visual area 610.

Figure 7:
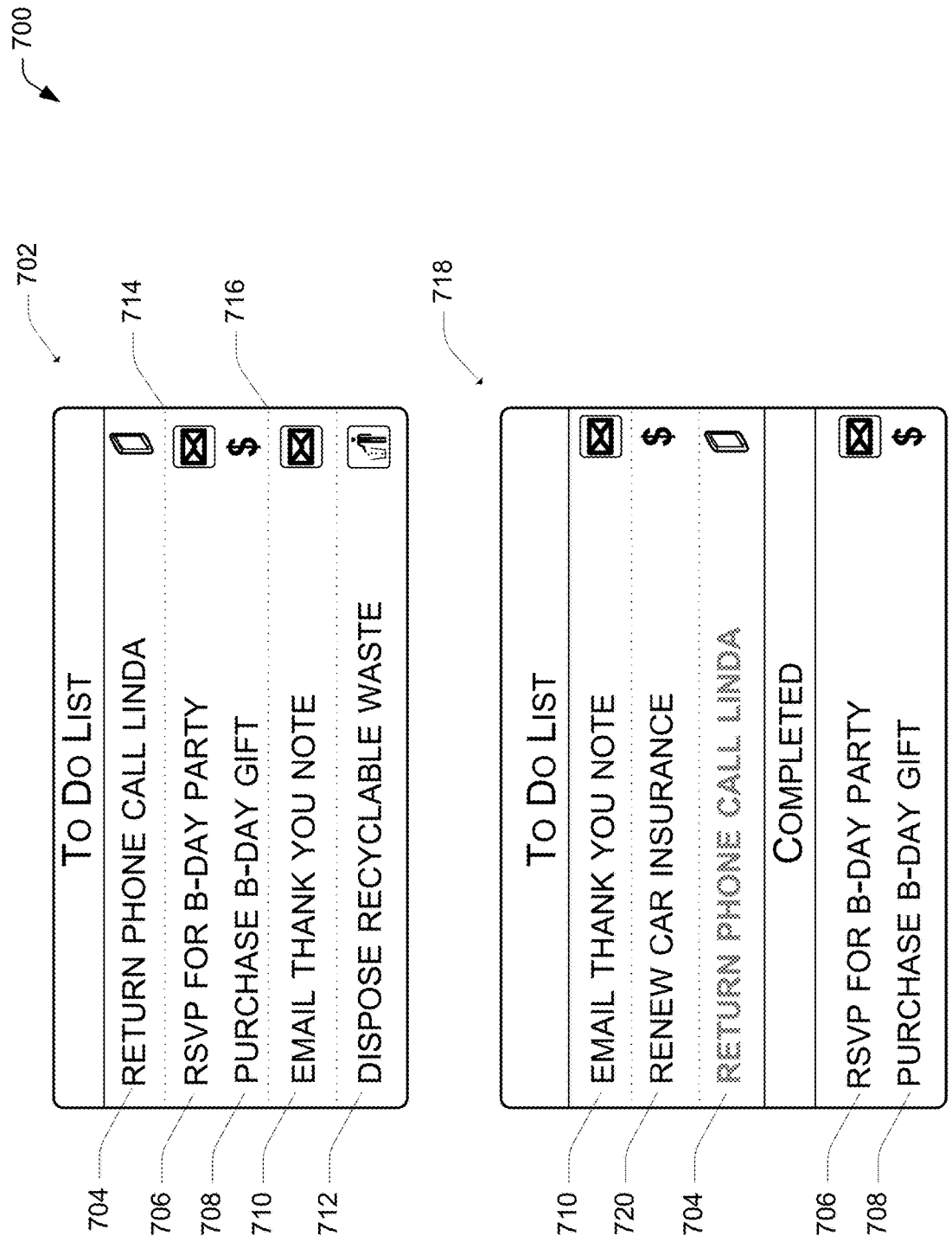
FIG. 7 is an example interface for managing task items in a graphical user interface, according to various examples.

FIG. 7 illustrates an example interface for managing task items. Referring to FIG. 7, suppose that the user 118 maintains a to-do list 702 that includes a task item 704 that represents returning a phone call, a task item 706 that represents submitting an rsvp for a birthday party, a task item 708 that represents purchasing a birthday gift, a task item 710 that represents sending an e-mail, and a task item 712 that represents a reminder to dispose of recyclable waste. As described herein, the dependency prediction model 210 may identify a relationship between the task item 706 and the task item 708. Further, the task performance model 108 may recommend that the service provider 102 apply a graphical effect to the task items 706 and 708 in order to influence the user 118 to perform the task items 706 and 708 (i.e. submit an rsvp for the birthday party and purchase a birthday gift). As illustrated in FIG. 7, the service provider 102 may display the task items 706 and 708 in a shared visual area created by the placement of the dividing lines 714 and 716 in order to communicate the relationship between the tasks items 706 and 708 to the user 118.

Further, as described herein, the service provider 102 may modify the to-do list 702 to create the to-do list 718. In some examples, the service provider 102 may create the to-do list 718 in response to creation of a task item, deletion of a task item, at periodic intervals, at random times, at other times, and/or in response to activity by the user 118 and/or service provider 102. As illustrated in FIG. 7, the service provider 102 may re-order the task items 704, 706, 708, and 710. For instance, the task performance model 108 may cause the service provider 102 to move the task item 710 to the top of the to-do list 718. Additionally, or alternatively, the threshold prediction model 208, the dependency prediction model 210, and/or the intent prediction model 212 may cause the re-ordering of the task items of the to-do list 718.

Further, the service provider 102 may sort the task items of the to-do list 718. For instance, the task performance model 108 may cause the service provider 102 to place the task items 706 and 708 under a heading for completed task items. Additionally, or alternatively, the threshold prediction model 208, the dependency prediction model 210, and/or the intent prediction model 212 may cause the sorting of the task items of the to-do list 718.

In addition, the task performance model 108, the threshold prediction model 208, the dependency prediction model 210, and/or the intent prediction model 212 may cause the service provider 102 to remove the task item 712. For example, the threshold prediction model 208 may determine a threshold value associated with the task item 712. Further, the task performance model 108 may recommend displaying the to-do list 718 without the item 712 based at least in part on the threshold value.

Further, the task performance model 108 may cause the service provider 102 to add a new task item 718 that represents renewing car insurance in the to-do list 718. Additionally, the task performance model 108 may cause the task performance application 106 to apply a graphical effect to a task item. As illustrated in FIG. 7, the task performance model 108 may cause the task performance application 106 to emphasize the text of the task item 704.

What is claimed is:

1. A system comprising:
one or more processors; and
memory storing computer-executable instructions that, when executed, cause the one or more processors to perform acts comprising:
creating training data by:
determining, based at least in part on a first user profile associated with a first user, a past performance by the first user of a past task item; and
accessing user data associated with the first user profile, the user data including demographic information and user interaction information associated with the first user;
accessing historical task item data associated with a task item type of the past task item, the historical task item data including information associated with a plurality of performances of other past task items of the task item type;
creating a task performance model based at least in part on a machine learning engine by:
analyzing the user data of the first user and other historical user data associated with other users to determine a first plurality of indicators that correlate with performance of the past task item;
analyzing the historical task item data of the task item type to determine a second plurality of indicators that correlate with performance of the task item type of the past task item; and
creating the task performance model based at least in part on indicators of at least the first plurality of indicators or the second plurality of indicators to determine a recommended action that maximizes a likelihood of a current user performing a pending task item based on occurrences of the indicators in at least one of current user data or current task item data, the task performance model including weights for individual indicators that apportion an influence of the indicators in determining the recommended action; and
deploying the task performance model by:
identifying a current task item of the task item type associated with a second user profile of a second user;
determining an amount of time the current task item has been pending;
determining, using the task performance model, a new recommended action based at least in part on the current task item, weights for the individual indicators, second user profile, and the amount of time; and
performing the new recommended action with respect to the second user profile.

2. The system as recited in claim 1, wherein the performing the new recommended action with respect to the second user profile further includes:
displaying the current task item to the second user; and
applying a graphical effect to a display of the current task item.

3. The system as recited in claim 1, wherein the acts further comprise:
creating a task threshold model by:
creating the task threshold model based at least in part on indicators of the first plurality of indicators or the second plurality of indicators to determine a threshold amount of time during which the likelihood of the current user performing the pending task item is greater than a predetermined score based on occurrences of the indicators in the at least one of current user data or current task item data.

4. The system as recited in claim 3, wherein the acts further comprise:
determining that the amount of time the current task item has been pending is greater than the threshold amount of time; and
removing the current task item from a list of pending task items.

5. A method comprising:
    analyzing, based at least in part on a machine learning engine, historical data to determine a plurality of indicators that correlate with performance of an action with respect to a plurality of list items;
    determining, based at least in part on one or more indicators of the plurality of indicators, a recommendation function;
    determining, based at least in part on first occurrences of the one or more indicators in at least one of current user data or task item data, a threshold function to determine a first amount of time during which a likelihood of performance of the action is greater than a predetermined score;
    determining, via the recommendation function, a recommended action, the recommendation function determining the recommended action based at least in part on a user profile and occurrences of the one or more indicators in at least information associated with a current list item;
    determining a second amount of time in which the current list item is pending is greater than the first amount of time; and
    performing the recommended action based at least in part on the second amount of time being greater than the first amount of time, the recommended action including removing the current list item from the plurality of list items.

6. The method as recited in claim 5, further comprising:
    determining weights for individual indicators that apportion influence of the plurality of indicators in the recommendation function that determine the recommended action; and
    deploying the weights in the recommendation function.

7. The method as recited in claim 5, wherein the analyzing the historical data further comprises analyzing a plurality of user profiles including demographic information and user interaction information to determine the plurality of indicators that correlate with performance of the plurality of list items.

8. The method as recited in claim 7, wherein the plurality of indicators include at least one of purchase data, browsing data, locations associated with the user profile, financial information associated with the user profile, or an age of a user associated with the user profile.

9. The method as recited in claim 5, wherein the analyzing the historical data further comprises analyzing attributes of the plurality of list items that have been performed to determine the plurality of indicators that correlate with performance of the action, the plurality of list items related to a common type of list item.

10. The method as recited in claim 5, further comprising:
    receiving the current list item from a device associated with the user profile;
    determining a user intent corresponding to the current list item; and
    wherein the plurality of indicators that correlate with performance of the action with respect to the plurality of list items include the user intent.

11. The method as recited in claim 5, wherein the current list item represents a first list item, and the method further comprising:
    generating a dependency function based at least in part on the plurality of list items to determine a first type of list item with a first likelihood of performance and a second type of list item associated with a second likelihood of performance;
    determining that the first list item is of the first type of list item;
    identifying a second list item of the second type of list item, the second list item associated with the user profile; and
    performing the recommended action with regard to the second list item.

12. The method as recited in claim 11, wherein the performing the recommended action with regard to the second list item includes visually grouping the first list item and the second list item within a graphical user interface.

13. The method as recited in claim 5, wherein the performing the recommended action with regard to the current list item further includes applying a graphical effect to listing display of the current list item.

14. The method as recited in claim 5, wherein the current list item includes at least one of a task on a to-do list, a content item of a playlist for user consumption, or a purchase item on a wish list.

15. A method comprising:
    compiling list item data associated with a plurality of past list items that have been performed;
    analyzing, based at least in part on a machine learning engine, the list item data to determine a plurality of indicators that correlate with respective past performance of the plurality of past list items;
    generating a threshold function based at least in part on the plurality of indicators to determine a first amount of time during which a likelihood of a current user performing a pending list item is greater than a predetermined score based on occurrences of the indicators in user interaction data;
    identifying, in association with a user profile, a current list item and a portion of the user interaction data;
    determining a threshold value using the threshold function based at least in part on the current list item and the portion of the user interaction data associated with the user profile;
    determining a pendency value that represents a second amount of time that the current list item has been pending based at least in part on the user profile; and
    performing an action based at least in part on determining the pendency value is greater than the threshold value, the action including at least displaying the current list item to the user.

16. The method as recited in claim 15, wherein the current list item represents a first list item and, further comprising:
    generating a dependency function based at least in part on the plurality of list items that have been performed to determine a first type of list item with a first likelihood of performance associated with a second likelihood of performance of a second type of list item;
    determining that the first list item is of the first type of list item;
    identifying a second list item of the second type of list item, the second list item associated with the user profile; and
    performing the action with regard to the second list item.

17. The method as recited in claim 15, wherein performing the action further comprises displaying the current list item with a graphical effect.

18. The method as recited in claim 15, wherein performing the action further comprises removing the current list item from a list of pending list items associated with the user profile.

19. The method as recited in claim 5, wherein the plurality of indicators correlate to performance of the action within a threshold amount of time of an individual list item being created.

20. The system as recited in claim 1, wherein performing the new recommended action comprises removing the current task item.

\* \* \* \* \*